(12) United States Patent
Livingston et al.

(10) Patent No.: US 9,862,628 B2
(45) Date of Patent: Jan. 9, 2018

(54) ADJUSTABLE VARIABLE BUBBLE SIZE AERATION FOR SUBMERGED MEMBRANE AIR SCOUR

(71) Applicants: OVIVO LUXEMBOURG S.A.R.L., Munsbach (LU); AQUACONSULT ANLAGENBAU GMBH, Traiskirchen (AT)

(72) Inventors: Dennis Livingston, Austin, TX (US); Douglas John Boucher, Austin, TX (US); Noboru Funakubo, Vienna (AT); Christopher Bryan Lewis, Austin, TX (US)

(73) Assignees: Ovivo Inc., Montreal (CA); Aquaconsult Anlagenbau GmbH, Traiskirchen (AT)

( * ) Notice: Subject to any disclaimer, the term of this patent is extended or adjusted under 35 U.S.C. 154(b) by 122 days.

(21) Appl. No.: 15/027,231

(22) PCT Filed: Oct. 3, 2014

(86) PCT No.: PCT/IB2014/002830
§ 371 (c)(1),
(2) Date: May 19, 2016

(87) PCT Pub. No.: WO2015/049590
PCT Pub. Date: Apr. 9, 2015

(65) Prior Publication Data
US 2016/0280573 A1 Sep. 29, 2016

Related U.S. Application Data

(60) Provisional application No. 61/887,262, filed on Oct. 4, 2013.

(51) Int. Cl.
| | |
|---|---|
| *C02F 3/20* | (2006.01) |
| *B01D 63/08* | (2006.01) |
| *B01D 65/08* | (2006.01) |
| *B01F 3/04* | (2006.01) |

(Continued)

(52) U.S. Cl.
CPC .............. *C02F 3/201* (2013.01); *B01D 61/18* (2013.01); *B01D 63/082* (2013.01); *B01D 65/02* (2013.01);
(Continued)

(58) Field of Classification Search
None
See application file for complete search history.

(56) References Cited

U.S. PATENT DOCUMENTS

| | | | |
|---|---|---|---|
| 4,631,134 A | 12/1986 | Schussler | |
| 6,543,753 B1 * | 4/2003 | Tharp | A01N 25/34 210/220 |

(Continued)

FOREIGN PATENT DOCUMENTS

| | | | | |
|---|---|---|---|---|
| JP | 2010214237 | | 9/2010 | |
| KR | 101320376 B1 * | | 10/2013 | ................ C02F 3/20 |
| WO | WO2013008522 | | 1/2013 | |

*Primary Examiner* — Chester T Barry
(74) *Attorney, Agent, or Firm* — Thomas M. Freiburger

(57) ABSTRACT

In a submerged membrane bioreactor (MBR or SMU), diffusers are used to eject air bubbles, primarily to facilitate the movement of mixed liquor past the membrane surfaces, cleaning and scouring the surfaces of the membranes with the mechanical energy of the combined air/liquid/solids movement. Oxygen transfer from the bubbles into the mixed liquor is often a secondary goal, for supplying oxygen to biological processes. The invention involves the use of a specific bubble diffuser, oriented at a selected upward angle, to enable a single style diffuser to accomplish simultaneous generation of mid-size and fine bubble aeration, with adjustment of the tilt angle varying the percentages of mid-size and fine bubble aeration. The angle selection, along with the number of diffusers and air volume selected, allows achievement of target liquid movement through the MBR.

9 Claims, 4 Drawing Sheets

(51) Int. Cl.
*C02F 3/12* (2006.01)
*B01D 61/18* (2006.01)
*B01D 65/02* (2006.01)
*B01F 13/02* (2006.01)

(52) U.S. Cl.
CPC ............ *B01D 65/08* (2013.01); *B01F 3/0412* (2013.01); *B01F 3/04269* (2013.01); *B01F 13/0255* (2013.01); *B01F 13/0277* (2013.01); *B01F 13/0283* (2013.01); *C02F 3/1273* (2013.01); *C02F 3/1284* (2013.01); *B01D 2313/26* (2013.01); *B01D 2315/06* (2013.01); *B01D 2321/185* (2013.01); *B01F 2003/04148* (2013.01); *B01F 2003/04234* (2013.01); *B01F 2003/04312* (2013.01); *B01F 2215/0422* (2013.01); *C02F 2303/16* (2013.01); *C02F 2303/20* (2013.01); *Y02W 10/15* (2015.05)

(56) References Cited

U.S. PATENT DOCUMENTS

| 2002/0139748 A1* | 10/2002 | Cote | B01D 61/18 210/636 |
| 2010/0181263 A1* | 7/2010 | Buch | B01F 3/04269 210/758 |
| 2010/0300947 A1 | 12/2010 | Sun | |
| 2011/0101548 A1* | 5/2011 | Kim | B01F 3/04248 261/124 |
| 2011/0248414 A1* | 10/2011 | Reilly | B01F 3/04269 261/122.1 |
| 2011/0304063 A1* | 12/2011 | Ko | B01F 3/04262 261/77 |
| 2014/0264969 A1* | 9/2014 | Tharp | B01F 3/04269 261/100 |

* cited by examiner

ADJUSTABLE VARIABLE BUBBLE SIZE AERATION FOR SUBMERGED MEMBRANE AIR SCOUR

This application claims benefit of provisional patent application Ser. No. 61/887,262, filed Oct. 4, 2013.

BACKGROUND OF THE INVENTION

This invention concerns wastewater treatment, particularly membrane separators or MBRs (membrane bioreactors) submerged in mixed liquor to remove permeate and concentrate the mixed liquor.

More specifically, the invention is concerned with the use of a single type of air diffuser for MBRs and optionally for other wastewater treatment applications, with adjustment to provide coarse, mid-size or fine bubbles and to arrive at a targeted mix of such bubbles appropriate for the particular application.

Air diffusers have been used in wastewater treatment for two primary purposes: supplying oxygen to the biological processes, and supplying mixing energy to basins. When used for supplying oxygen, fine bubble diffusers are usually used. The fine bubbles have a greater ability to supply oxygen because of their higher ratio of bubble area to gas volume, as well as their slower rise velocity in liquids. The slow rise velocity, however, renders the fine bubbles less efficient at mixing. More energy is expended for fine bubbles to provide a given mixing energy as compared to larger bubbles.

When used for supplying mixing energy, coarse or mid-size bubble diffusers are typically chosen. The coarse bubbles are more efficient at mixing (electric cost per unit volume of basin) due to their higher rise velocity and lower pressure drop across the diffuser.

When used in a submerged membrane bioreactor (MBR, sometimes referred to as submerged membrane unit, SMU), diffusers are used primarily for facilitating the movement of mixed liquor past the membrane surfaces (a pumping/mixing action), while simultaneously cleaning and scouring the surfaces of the membranes with the mechanical energy of the combined air, liquid and solids movement. Oxygen transfer from the bubbles is a secondary goal, and in some applications, it can be a detriment to the overall treatment system design.

It would be desirable if a single configuration of diffuser could be used for different applications, whether to maximize the supplying of oxygen to mixed liquor or to maximize mixing and scouring action. Further, it would be desirable to have diffusers that could be adjusted to suit these different objectives.

SUMMARY OF THE INVENTION

The invention provides these benefits, with a novel arrangement of air diffusers.

As noted above, diffusers are used in MBRs to eject air bubbles, primarily to facilitate the movement of mixed liquor past the membrane surfaces, cleaning and scouring the surfaces of the membranes with the mechanical energy of the combined air/liquid/solids movement. Different diffusers can be selected. Oxygen transfer from the bubbles into the mixed liquor is usually secondary. The invention involves the use of a specific configuration of flat panel air diffuser, positioned with its narrow dimension tilted upwardly so that an array of the diffusers resembles louvers. Using fine-bubble air diffusers, this causes bubbles from the lower areas of the diffuser to coalesce together to form mid-size or coarse bubbles, while bubbles from the upper areas of the diffuser remain fine. The upward angle can be adjustable, to enable a single style diffuser to be used for different applications and to accomplish simultaneous generation of mid-size and fine bubble aeration. The diffusers can be rotationally adjustable so as to enable adjustment of the percentage of mid-size and fine bubble aeration, to achieve a target liquid movement through the SMU. If needed to achieve desired biological oxygen demand, the angle can be lowered to produce a higher proportion of fine bubbles.

In addition, the SMU diffusers preferably are non-clogging and self-cleaning.

A primary object of the invention is to provide arrays of air diffusers in sewage treatment facilities, especially MBRs (SMUs), in a way that enables one style of diffuser to be used for different purposes. The diffusers can generate fine and mid-size to coarse bubbles simultaneously, with the proportion selectively adjustable. These and other objects, advantages and features of the invention will be apparent from the following description of a preferred embodiment, considered along with the accompanying drawings.

DESCRIPTION OF PREFERRED EMBODIMENTS

Figure 1:
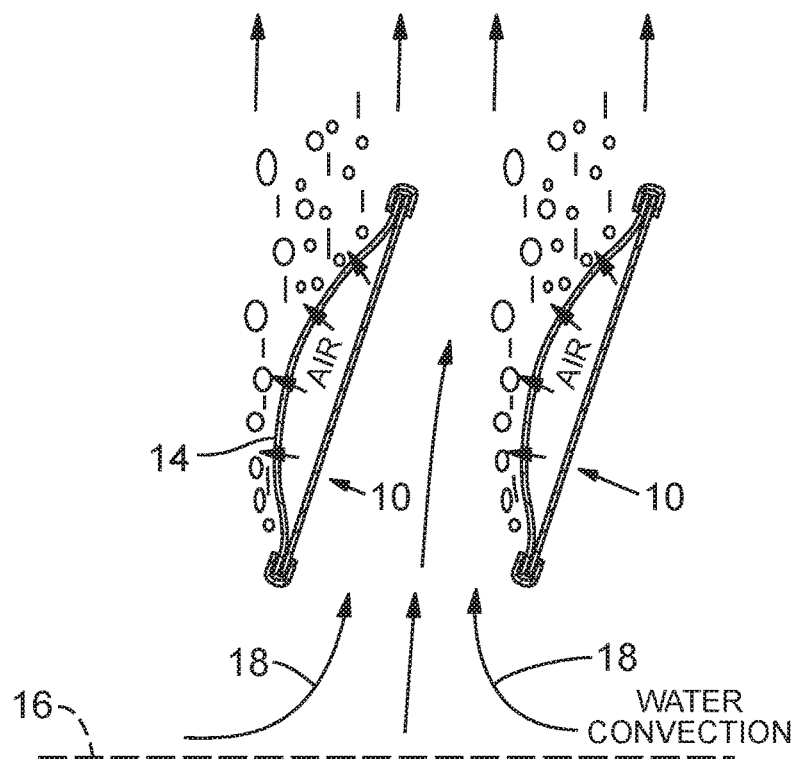
FIG. 1 is a schematic elevation view showing an arrangement of air diffusers according to the invention.

FIG. 1 illustrates the principle of the invention. Air diffusers are shown at 10, within a wastewater treatment basin, particularly a submerged membrane unit. The diffusers may be, for example, of the type sold under the name AEROSTRIP by Aquaconsult Anlagenbau GmbH of Austria, shown in FIG. 2. These diffusers are fine bubble diffusers, formed in an elongated rectangular shape with a metal frame and a polyurethane bladder air diffuser surface with a multiplicity of small air orifices. When pressurized with air, as via the compression fitting 12 shown in FIG. 2, the diffuser surface or bladder 14 expands outwardly and releases air through the orifices. When air pressure is shut off, the orifices actually function to block wastewater or mixed liquor from backflowing into the diffuser. The small holes will substantially close in the absence of internal diffuser pressure. The orifices can be produced by puncturing needles that are pushed through the bladder.

Figure 2:
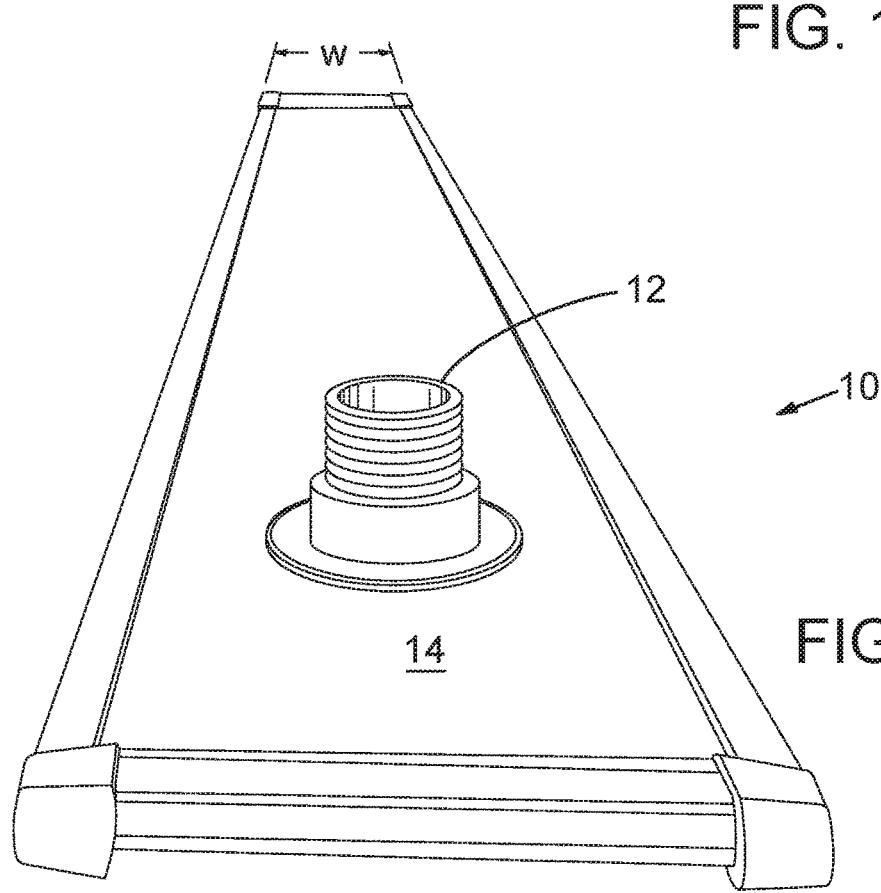
FIG. 2 is a perspective view showing a type of air diffuser that can be used with the invention.

As an example, a diffuser used with the invention can have specifications as follows:
Nominal pore size: 0.1 mm-2.0 mm
Pressure drop: 1 kPa-20 kPa
Flux range: 0-300 $Nm^3/hm^2$ The invention is not limited to the described form of diffuser. Other diffusers having a width w (FIG. 2) presenting a surface at least a few inches wide can be used. The diffuser 10, particularly of the type shown in FIG. 2, are ordinarily installed flat, horizontally down to a surface such as the floor of a basin. The air compression fitting 12 is thus shown in FIG. 2 on the top surface of the diffuser. However, for the invention the diffusers are not horizontal, and the air fitting could be on the back side of the diffuser. Such a diffuser under typical design conditions of air flow and pressure will produce bubbles of roughly about 1 mm or somewhat larger, which can be considered fine bubbles.

In FIG. 1 the diffusers are shown inclined upwardly, i.e. the width of each diffuser is at an inclined angle to the floor of the tank. As an example, this angle φ can be about 80°. Preferably they are mounted above the tank floor, which is indicated in FIG. 1 by the dashed line 16. The effect of the upwardly angled diffusers 10 is to release fine air bubbles at a series of different heights along the inclined width of each diffuser. The bubbles released lowest tend to gather with other bubbles as they rise, coalescing into larger bubbles. The higher the location where the bubbles are originally released by the diffuser, the more they tend to remain as fine bubbles. The slightly billowed shape of the inflated diffuser face 14 can contribute to this effect, in that the lowermost released bubbles will tend to slide along the surface more than bubbles released near the upper end, where the angle of the bladder surface is at a lower angle (less vertically inclined), as can be seen in FIG. 1. Bubble travel along the surface promotes coalescing.

The result is that these inclined diffusers release a mix of air bubbles, fine bubbles for better delivery of oxygen to the mixed liquor, these bubbles being slower rising, and coarser bubbles for faster rising, less oxygenation, and better for generating water convection and air scouring, as when needed for membrane bioreactors. The coarser bubbles will typically be mid-size bubbles (less than ¼ inch), although coarse bubbles can be generated in high MLSS or along a longer slope. The angle of the diffuser can be set as desired, depending on the proportion of fine and coarser bubbles desired for the particular application.

Water convection, as induced by the rising bubbles and particularly the coarser bubbles, is indicated by arrows 18 in FIG. 1. The diffusers are spaced above the floor to better promote water flow up between the diffusers, as induced by the rising bubbles.

Figure 3:
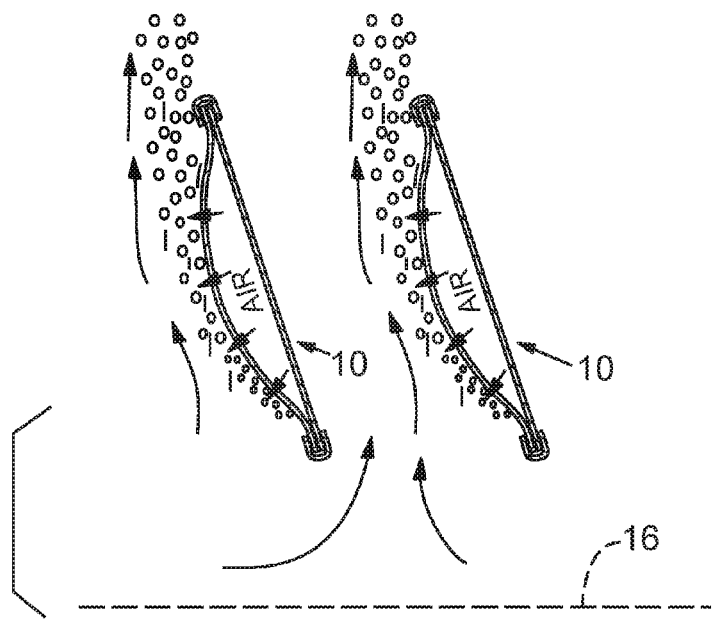
FIG. 3 is a schematic view similar to FIG. 1, showing the air diffusers oriented at a different angle.

The angle of inclination at which the diffusers are set can be vertical, i.e. 90° to the basin floor 16, or can be a lower angle than shown in FIG. 1, or it could even be an angle beyond 90°, such as 105°, 110° or 120°, thus to further increase the proportion of coarser bubbles (and the coarseness of bubbles), by allowing more bubbles to gather along the surface 14 and coalesce. The range of angles could be from about 0° to about 180°. For benefits of the invention the range will usually be about 60° to about 120°, although an adjustable array of diffusers can be adjustable to horizontal (or nearly horizontal) for a mode wherein only fine bubbles are to be generated. FIG. 3 illustrates an inclination beyond 90°, and indicates a large proportion of coarse bubbles rising from those diffusers. In this inclination many of the orifices, i.e. those near the bottom end, and potentially all orifices, will be oriented at a downward inclination.

Figure 4:
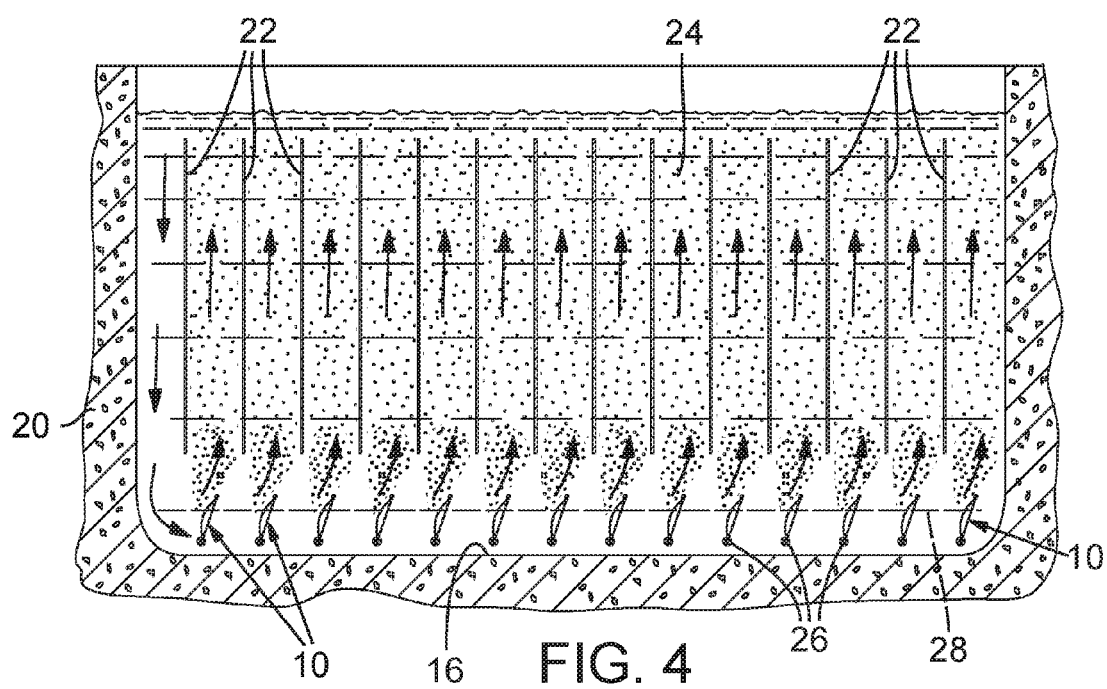
FIG. 4 is a schematic elevation view in cross section, showing an array of diffusers at a selected angle, positioned within a submerged membrane unit, shown at the bottom of a basin.

FIG. 4 is a schematic view in sectional elevation, indicating a tank or basin 20 having a series of flat plate membranes or membrane cartridges 22 positioned in plane-vertical configuration, as in an MBR. The cartridges actually are in cassettes or membrane assemblies, each holding many parallel membranes. The MBR contains wastewater, i.e. mixed liquor indicated at 24. Below the membrane cartridges is a row or array of air diffusers 10, shown at an inclined angle as discussed above. These diffusers are positioned above the bottom 16 of the basin as discussed above, to promote water convection, again indicated by arrows.

In FIG. 4 the diffusers 10 are schematically shown with pivot axes 26 at their lower ends. This may be desirable in some installations in order to allow angular adjustment after installation, to "tune" the operation of a basin process, achieving a desired balance of fine and coarser aeration bubbles for a particular process application. Similarly, a process might be modified within an MLSS tank, whether an MBR tank or another process, where oxygen requirements might be increased or decreased for the modified process, or coarser bubble generation might be needed to induce liquid flow, as in a highly thickened MLSS. An actuator is indicated at 28 (dashed line), mechanically connected to the ends of all diffusers in the array, to effectuate such dynamic angular adjustment.

Figure 5:
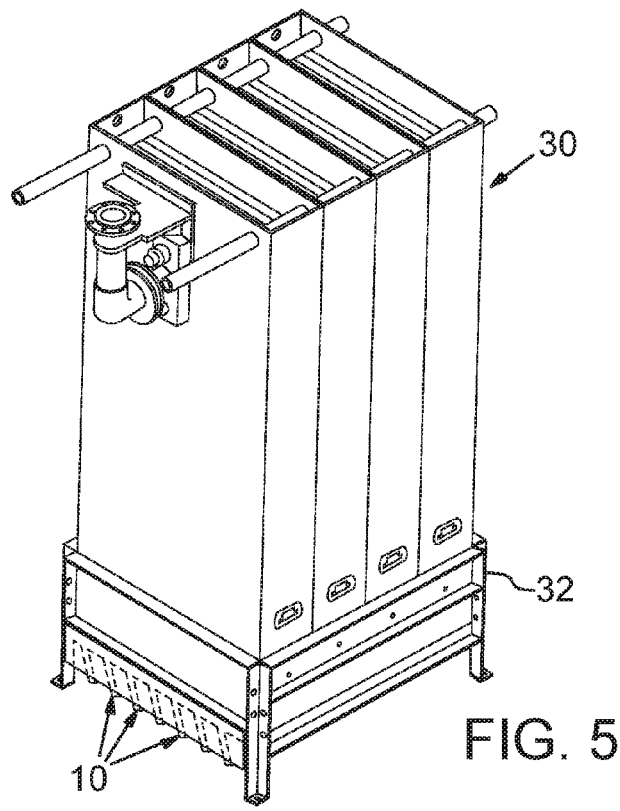
FIG. 5 is a perspective view showing a bank of membrane cassettes and a bottom frame retaining air diffusers below the membranes and configured according to the invention.

FIG. 5 shows a bank of membrane assemblies or cassettes of flat-plate membranes 30, each holding flat-plate membrane cartridges. The unit 30 can be one of several or many within an MBR tank or basin. At the bottom is shown a frame 32 that retains a series of air diffusers 10, upwardly angled as discussed above, spaced a prescribed, effective distance below the membranes. In an MBR the air bubbles from the diffusers are important for mixing and scouring, inducing water convection and keeping the membrane surfaces free of fouling. Aeration of the mixed liquor can also be important in many MBR applications.

Figure 6:
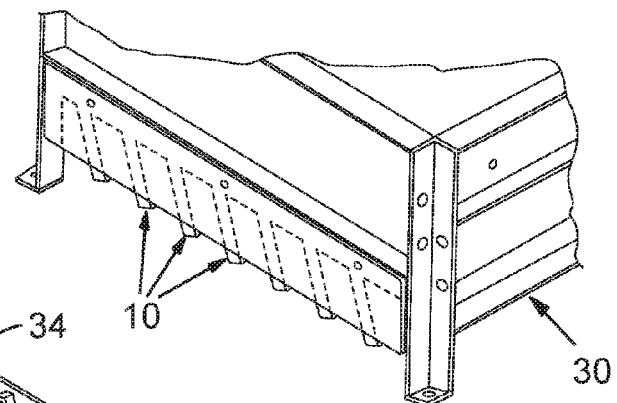
FIG. 6 is an enlarged detail view showing the bottom portion of FIG. 5.
Figure 7:
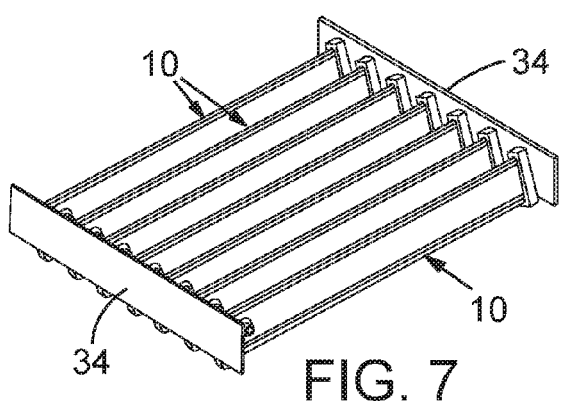
FIG. 7 is a perspective view showing an array of air diffusers angled as in an embodiment of the invention.
Figure 8:
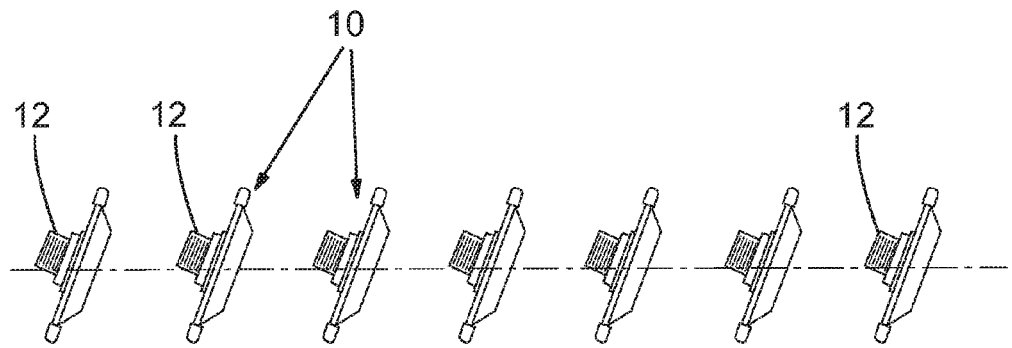
FIG. 8 is an elevation view showing the diffusers, without the retaining frame.
Figure 9:
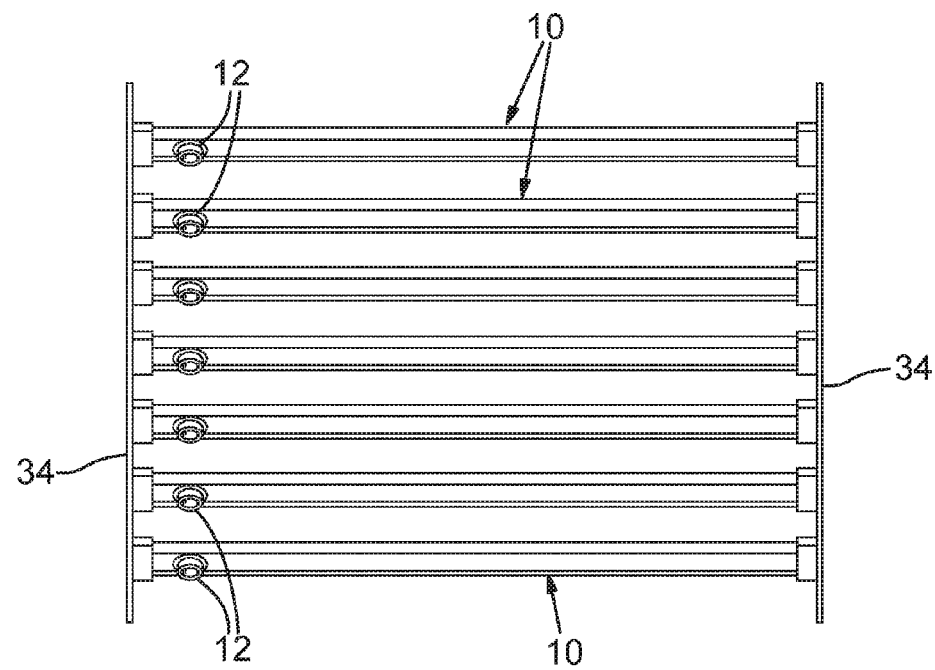
FIG. 9 is a plan view showing the diffusers and retention frame.

FIGS. 6-9 show the air diffusers. In FIG. 6 the lower end of the unit 30 is shown in more detail, revealing the portion of the frame retaining the diffusers 10 in the desired angled positions. FIG. 7 also shows the diffusers 10, retained by end members 34 of the frame. FIG. 8 shows the angled diffusers themselves, spaced apart as desired for the volume and distribution of bubbles desired, and without the frame. FIG. 9 is a plan view of the diffusers 10 retained by the frame in members 34.

FIG. 8 shows the air compression fittings 12 on the diffusers. With the diffusers tilted upwardly pursuant to the invention, these compression air fittings could be on the back sides if desired. Although the array of diffusers is shown such the long dimension of each diffuser would be parallel to the planes of the membrane cartridges, this relationship could be perpendicular if desired.

Several tests were conducted with the invention in clean water, comparing bubble rise velocity, which is a function of bubble size, to diffuser inclination angle, and also comparing bubble rise velocity to air flow rate for a constant diffuser angle. The tables below show the results.

TABLE 1

BUBBLE RISE VELOCITY WITH DIFFERENT ANGLES
AIR FLOW = 89 scfm

| Inclination Angle | Avg. Rise Velocity |
|---|---|
| 80° | 43.84 cm/s |
| 105° | 45.24 cm/s |

TABLE 2

BUBBLE RISE VELOCITY VS. AIR FLOW
INCLINATION ANGLE = 80°

| Air Flow Rate | Avg. Rise Velocity |
|---|---|
| 76 scfm | 42.58 cm/s |
| 100 scfm | 44.10 cm/s |

Table 1 shows that an inclination at an angle of 80°, i.e. 80° tilt from horizontal, produced an average bubble rise velocity of 43.84 cm/s. This is approximately the angle shown in FIG. 1. The average rise velocity was calculated using twelve different points within a membrane tank, or MBR, bubble velocities being measured approximately two inches above the array of diffusers. Air flow was at 89 scfm. As the table shows, this is compared to an inclination angle of 105° (beyond vertical, generally as shown in FIG. 3), where average bubble rise velocity increased to 45.24 cm/s. The air flow rate was the same. The result shows that further bubble coalescing occurs at 105° as compared to 80° since, as discussed above, the fine bubbles evolving from the pores of the diffusing units are close together for a greater time and distance and tend to flow along the surface of the diffuser for a greater distance, thus promoting additional coalescing and coarse bubbles and a greater population of coarser bubbles.

Table 2 compares bubble rise velocity to air flow, for a constant inclination angle of 80°. The table shows that, at 76 scfm flow rate, average rise velocity was 42.58 cm/s. This is consistent with Table 1, where the first test was also at the 80° angle and average rise velocity was 43.84 cm/s, somewhat higher. Table 2 shows that when the flow rate was increased to 100 scfm (at the same 80° tilt angle), rise velocity increased to 44.10 cm/s.

Importantly, the two tables also show that an appreciably lower air flow rate can be employed to obtain bubbles that will produce a desired rise velocity to promote scouring flow. At only 89 scfm, but a 105° diffuser angle, average rise velocity was higher than at 100 scfm, and at 80° angle. This demonstrates the invention can save considerable energy by allowing reduced air flow when relatively coarse bubbles are required for scouring.

In the claims the terms "fine", "mid-size" and "coarse" are used relative to one another, not to be limiting except where a size is stated. Also, "frame" is to be considered any mechanical arrangement providing for pivoting of the diffusers. It should also be understood that the diffusers could be pivotable downwardly (below the plane of the pivot axes) rather than upwardly, and the invention is to be interpreted broadly in that sense.

The above described preferred embodiments are intended to illustrate the principles of the invention, but not to limit its scope. Other embodiments and variations to these preferred embodiments will be apparent to those skilled in the art and may be made without departing from the scope of the invention as defined in the following claims.

We claim:

1. In a wastewater treatment facility including membrane bioreactor (MBRs) with membrane units submerged in MLSS and with air diffusers positioned below the membrane units for aeration and/or air scouring of the membranes, the improvement comprising:
a series of the submerged air diffusers, each being elongated in length and having a width, the diffusers being arranged parallel to one another and at a desired spacing, and at a preselected distance below the membranes,
a supply of air, to each of the diffusers, so as to produce bubbles issuing from pores of the diffusers when air is delivered under pressure, and
the diffusers being inclined, the width dimension of each diffuser being tilted relative to horizontal, at an angle such as to allow evolving fine bubbles at lower areas of the angled diffusers to coalesce with other bubbles from pores at upper areas of the diffusers as they rise, to form coarser bubbles, while bubbles from highest pores at upper sides of the diffusers remain essentially as fine bubbles,
whereby bubbles of finer and coarser sizes can be produced from each diffuser, such that smaller, slower-rising bubbles can supply aeration requirements as needed while coarser, faster-rising bubbles can supply desired mixing and energy for air scour of the membranes as needed.

2. The improvement defined in claim 1, wherein the diffusers are angled about 60° to about 120° from horizontal.

3. The improvement defined in claim 1, wherein the diffusers are angled about 80° to about 120° from horizontal.

4. The improvement defined in claim 1, wherein the diffusers are angled more than 90° from horizontal.

5. The improvement defined in claim 1, wherein the diffusers are mounted in a frame, with means for adjustment of the angle of orientation of the diffusers.

6. The improvement defined in claim 5, wherein the series of diffusers are mechanically linked so that the angle of orientation of all diffusers can be adjusted simultaneously.

7. The improvement of claim 1, wherein the diffusers comprise a flexible bladder air diffuser surface with a multiplicity of small air orifices which, when the diffuser is not internally pressurized, close and seal against liquid intrusion.

8. The improvement of claim 1, wherein, at a preselected air flow rate through the diffusers, fine bubbles will be generated from the pores of each diffuser, with bubbles from lower parts of the diffuser coalescing to mid-size bubbles of less than ¼ inch.

9. In a wastewater treatment facility including membrane bioreactor (MBRs) with membrane units submerged in mixed liquor suspended solids (MLSS) and with air diffusers positioned below the membrane units for aeration and/or air scouring of the membranes, the improvement comprising:
a series of the submerged air diffusers, each being elongated in length and having a width, the diffusers being arranged parallel to one another and at a desired spacing, and at a preselected distance below the membranes,
a supply of air, to each of the diffusers, so as to produce bubbles issuing from pores of the diffusers when air is delivered under pressure,
a frame in which the diffusers are mounted for pivotal movement of the diffusers such that the width dimension of each diffuser can be tilted relative to horizontal and such that the series of diffusers can be tilted in unison, from an angle of about 0° to any desired tilt angle, the air diffusers at a selected inclined tilt angle allowing evolving fine bubbles at lower sides of the angled diffusers to coalesce with other bubbles as they rise, to form coarser bubbles, while bubbles from upper sides of the diffusers remain essentially as fine bubbles, whereby bubbles of finer and coarser sizes can be produced from each diffuser, such that smaller, slower-rising bubbles can supply aeration requirements as needed while coarser, faster-rising bubbles can supply desired mixing and energy for air scour of the membranes as needed, and whereby selection of a desired bubble size distribution can be made by selection of an angle of inclination.

* * * * *